J. S. HOLMES.
MUSIC SHEET AND SPOOL THEREFOR FOR AUTOMATIC PIANO PLAYERS.
APPLICATION FILED JAN. 2, 1915.
1,245,104.
Patented Oct. 30, 1917.
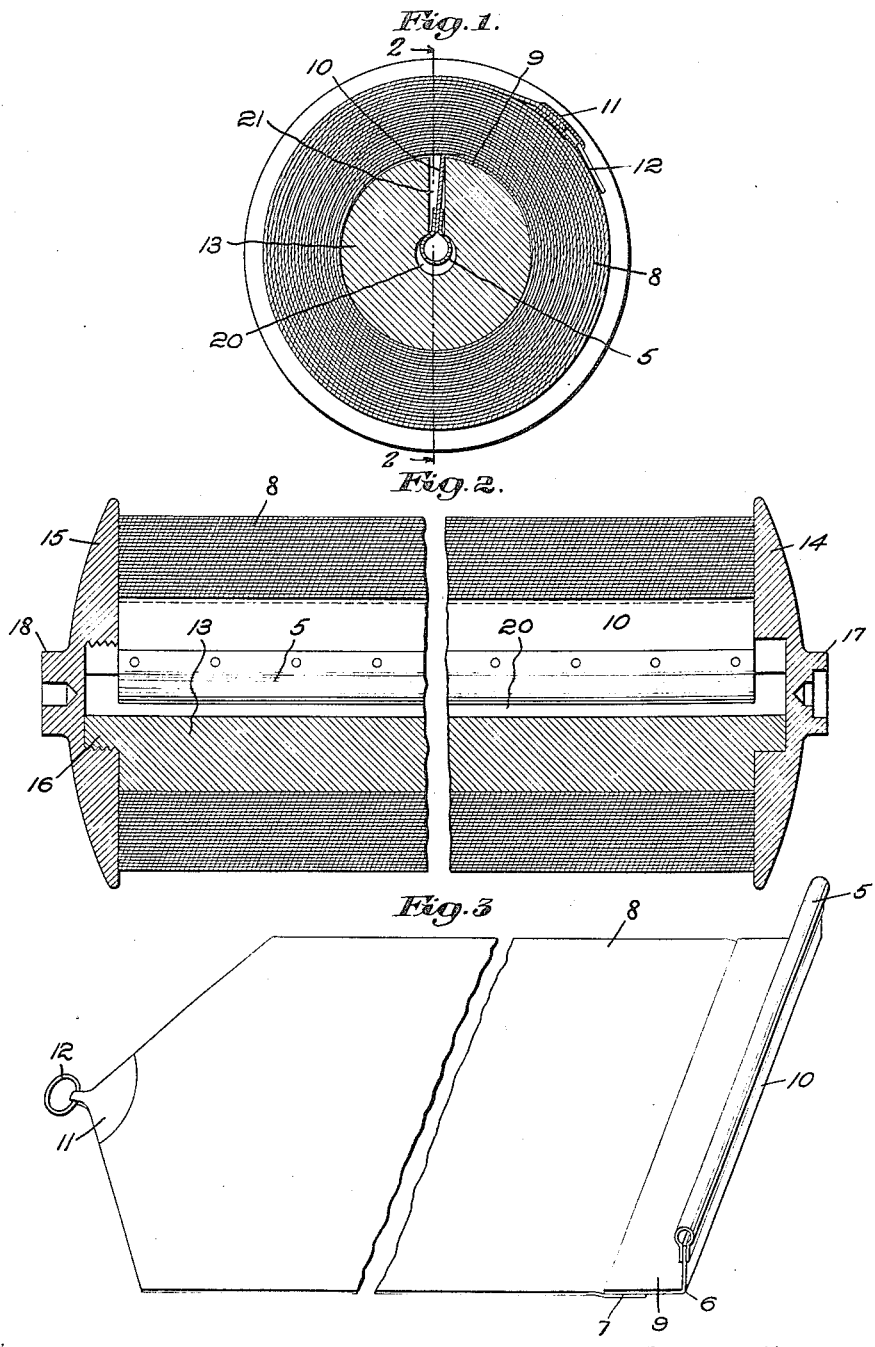
Witnesses:
Horace U. Crossman
Carl R. Choate.
Inventor:
James S. Holmes,
by Emery, Booth, Janney & Varney
Attys.

UNITED STATES PATENT OFFICE.

JAMES S. HOLMES, OF NEW YORK, N. Y., ASSIGNOR TO AMERICAN PIANO COMPANY, OF NEW YORK, N. Y., A CORPORATION OF NEW JERSEY.

MUSIC-SHEET AND SPOOL THEREFOR FOR AUTOMATIC PIANO-PLAYERS.

1,245,104.  Specification of Letters Patent.  Patented Oct. 30, 1917.

Application filed January 2, 1915. Serial No. 92.

*To all whom it may concern:*

Be it known that I, JAMES S. HOLMES, a citizen of the United States, and a resident of New York, county and State of New York, have invented an Improvement in Music-Sheets and Spools Therefor for Automatic Piano-Players, of which the following description, in connection with the accompanying drawings, is a specification, like characters on the drawings representing like parts.

This invention relates to perforated note sheets for automatic piano players and the like and pertains more particularly to a provision for avoiding the necessity for supplying an individual spool for and permanently attached to each note sheet.

As note sheets have been made heretofore and prepared for sale, one of the considerable items of expense has been the spool to which the rear end of the note sheet was attached by glue or otherwise, so that the spool constituted the permanent means for receiving the sheet and storing it when not in use. It is one of the objects, among others, of this invention to avoid the necessity for providing a spool for each sheet.

The character of the invention may be readily understood by reference to an illustrative embodiment shown in the accompanying drawings, in which:

Figure 1 is a section on a plane perpendicular to the axis of an illustrative form of spool showing one practicable form of note sheet wound thereon;

Fig. 2 is an axial section of the spool shown in Fig. 1 on the line 2, 2 of Fig. 1; and Fig. 3 is a perspective showing the advance and rear ends of the illustrative form of note sheet.

In accordance with this invention, a number of note sheets and a single spool may be relatively so constructed that the spool may be used interchangeably with the several note sheets simply by attaching the particular sheet desired to be used, to the spool; and using them together in the automatic instrument. Thereafter the first note sheet may be removed from the spool and replaced by another.

Referring to the drawings, the illustrative note sheet is provided with means for detachably connecting its rear end to a spool, preferably while the note sheet is wound up in the form of a roll, exemplified by a detachable fastening device in the form of a bead 5 secured directly or indirectly to the rear end of the note sheet as by being pasted or riveted to a reinforcing or stiffening member 6, pasted or otherwise secured at 7 to the note sheet 8. The stiffening member 6 may be made of metal, pasteboard or the like and it is preferably so formed that a part 9 thereof may have or may assume a parti-cylindrical or other shape to fit the outer surface of a spool; and that a part 10 may have or may assume a position in a substantially radial plane when the note sheet is wound into a roll. The opposite end of the note sheet 8 may be provided with means for securing the same to a take-up roll, as, for instance, a tab 11 and ring 12 of the usual type.

To coöperate with the particular construction of note sheet described above, some such spool as that shown in the drawing may be employed. This illustrative spool comprises a body 13 having flanges 14 and 15. For the purposes of the specific illustrative construction, it is preferred that the note sheet when wound into a roll, be assembled with the spool, by telescoping them together in the direction of the axis of the spool; and to suit this end the flange 15 of the spool is made readily removable as by being threaded upon a hub 16 projecting from one end of the spool. The flanges 14 and 15 may be provided with any suitable means 17 and 18 by which to support the spool in the instrument.

The body 13 of the spool is provided with a seat 20 adapted to receive and preferably to confine the bead 5 of the note sheet 8. A channel 21 communicates with the seat 20 and leads to the outer surface of the spool body 13. Preferably the bead 5 or its equivalent or substitute, secured to the end of the note sheet, constitutes an enlargement by which that end of the note sheet may be more or less firmly or positively held in desired relation with the spool and as illustrated in Fig. 1 the enlargement or bead 5 is so proportioned relative to the seat 20 and the channel 21 that when the bead is positioned in the seat 20 it is held therein against a tendency to draw it out radially of the spool, while the stiffening means or other part to which the bead 5 is connected may pass out through the channel 21 to the exterior of the spool to be wound or positioned thereon with the note sheet.

In the use of the described illustrative devices,—assuming the spool to be empty and the note sheet to be wound in a roll adapted to fit over the body 13 of the spool—the flange 15 is removed from the spool and the body 13 is inserted endwise into the hollow core of the note sheet roll, the bead 5 entering endwise into the seat 20 and the stiffening strip 10, or other part, entering edgewise into the end of the channel 21. When the note sheet roll parts have been initially introduced to the corresponding parts of the spool, the two may be then readily telescoped by relatively moving them axially until the note sheet reaches a proper position on the spool body whereupon the flange 15 may be returned to position wherein it serves to lock the bead 5 in place and thereby securely lock the rear end of the note sheet to the spool. Obviously the pull of the note sheet to be resisted by its attachment to the spool, is in a general tangential direction and the described arrangement adequately prevents any such tangential pull from parting the note sheet from the spool.

When the parts have been assembled as described, they may be inserted together into an automatic player in the usual manner; the ring 12 of the note sheet may be secured to the take-up roll; and then the note sheet may be wound onto the take-up roll and rewound onto the spool in the usual manner. Thereafter the flange 15 may be again removed and the note sheet withdrawn and replaced by another.

It is to be understood that this invention is not limited to the particular details of construction and organization described above for illustration. On the contrary the specific construction may be variously modified and the invention may be variously embodied within the scope of the subjoined claims.

Claims:

1. The combination with a note sheet spool having a longitudinal slot and a removable flange, of a note sheet having spool engaging means of relatively greater diameter than the width of said slot and adapted to be connected to said spool by relatively moving the spool and rolled note sheet in the direction of the longitudinal axis of the spool.

2. The combination with a note sheet spool having a longitudinal slot and a removable flange, of a note sheet having spool engaging means of relatively greater diameter than the width of said slot and adapted to be disconnected from said spool by relatively moving the spool and rolled note sheet in the direction of the longitudinal axis of the spool.

3. The combination of a slotted spool and a note sheet, the spool having a removable flange to permit the note sheet in the form of a roll to be applied to the spool by moving the same endwise onto the spool; and means upon the rear end of the note sheet to bridge the slot in the spool when so applied.

4. The combination of a spool having a slotted barrel and a note sheet relatively constructed and arranged to be assembled by inserting the spool barrel endwise into the hollow core of the note sheet when rolled; means attached to the rolled note sheet and projecting into the hollow core thereof to prevent the direct withdrawal of the end of the sheet through the spool barrel slot when so assembled.

5. The combination of a spool and note sheet relatively constructed and arranged to be assembled by inserting the spool endwise into the hollow core of the note sheet when rolled; a removable flange for the spool arranged to hold the rolled note sheet in position when on the spool; a spool barrel having a slot formed therein; and means upon the end of the note sheet to bridge said slot interiorly of the spool barrel when so assembled.

6. The combination of a spool having a unitary barrel portion and a note sheet relatively constructed and arranged to be assembled by inserting the spool endwise into the hollow core of the note sheet when rolled; and coöperable securing means on the spool and note sheet constructed and arranged to be interengaged by the act of assembling the spool and note sheet as aforesaid.

7. As an article of manufacture, a spool for a note sheet having, in combination, a removable flange; a unitary barrel portion; a recess parallel to the spool axis arranged to receive fastening means on a note sheet, said recess having an entrance arranged to be at least partially closed by said flange.

8. As an article of manufacture, a spool for a note sheet having, in combination, a seat extending lengthwise of the spool and connected by a comparatively restricted passage with the exterior surface of the spool, said seat having an axially opening entrance portion adapted to receive fastening means on a note sheet and permitting the note sheet to extend through said passage to the exterior of the spool.

In testimony whereof, I have signed my name to this specification, in the presence of two subscribing witnesses.

JAMES S. HOLMES.

Witnesses:
A. R. PAYNTER,
FRANCIS H. B. BYRNE.